May 29, 1945.   C. W. LEGUILLON ET AL   2,377,018
METHOD OF AND APPARATUS FOR UNITING PLASTIC MATERIAL
Filed June 27, 1941
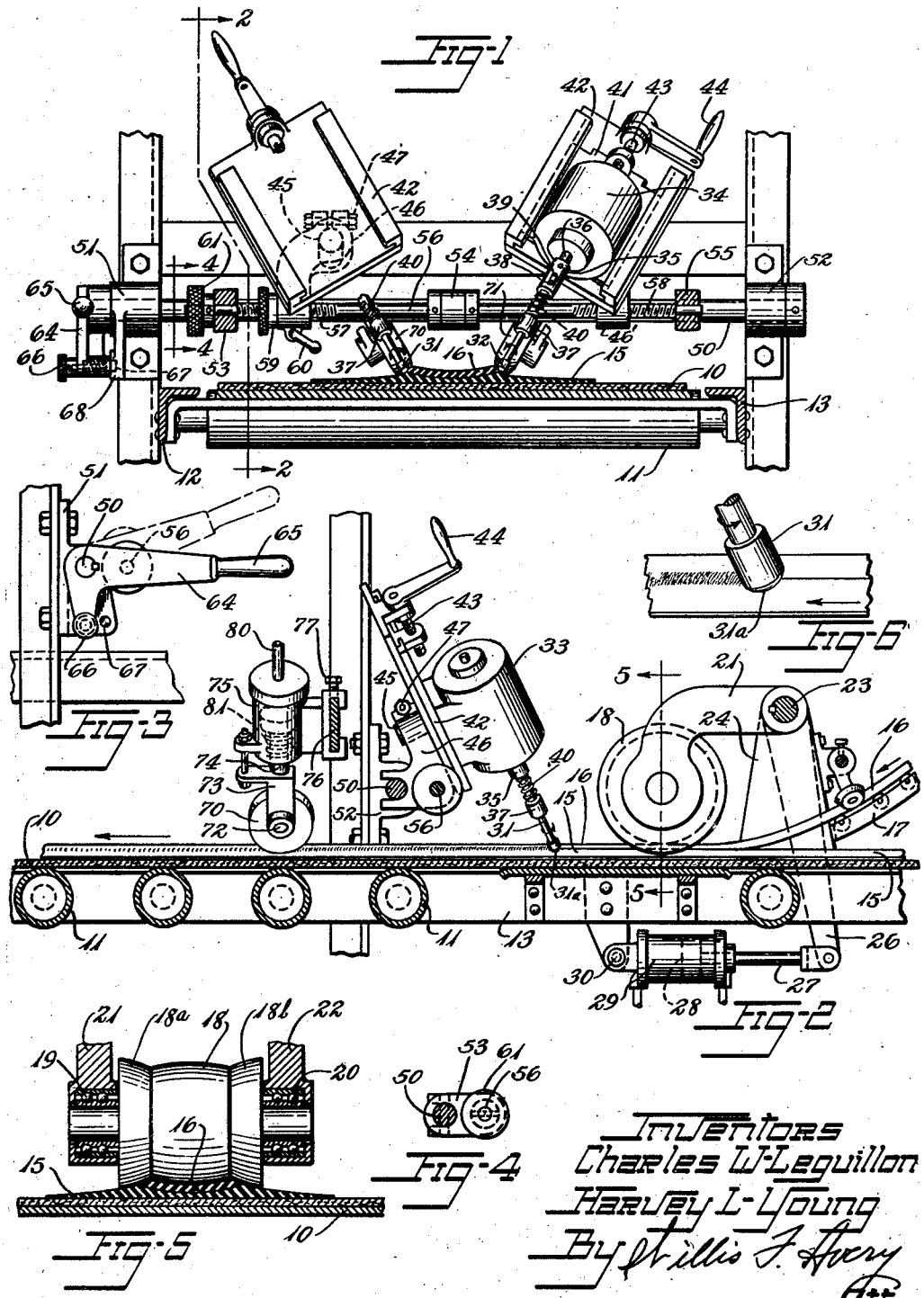
Inventors
Charles W. Leguillon
Harvey L. Young
By Willis F. Avery
Atty.

Patented May 29, 1945

2,377,018

UNITED STATES PATENT OFFICE 2,377,018

METHOD OF AND APPARATUS FOR UNITING PLASTIC MATERIAL

Charles W. Leguillon and Harvey L. Young, Akron, Ohio, assignors to The B. F. Goodrich Company, New York, N. Y., a corporation of New York Application June 27, 1941, Serial No. 400,074

12 Claims. (Cl. 154—9)

This invention relates to the manufacture of rubber-like plastic material in strip form, including slabs, strips and sheets, and is especially useful in the manufacture of composite tread slabs for tires.

Heretofore, where tread material for pneumatic tires has been assembled by bringing slab portions of extruded or calendered rubber together in superimposed relation, in the use of the tires built of such slab material, cracking of the slabs has sometimes occurred along the edges of the outermost slab portion, especially where the materials of the adjoining portions have been of different compositions or where dust or moisture has been permitted to enter the joint before vulcanization has taken place.

The principal objects of the invention are to provide a uniform composite slab or other strip free from cracks, to provide a commingling of different stocks to bond them to each other permanently, to provide effective sealing at margins, and to provide improved apparatus and procedure for assembling layers of slab material.

These and other objects will appear from the following description and the accompanying drawing.

Of the drawing:

Fig. 1 is a cross-sectional view of a slab-assembling apparatus constructed according to and embodying the invention, parts being broken away.

Fig. 2 is a longitudinal sectional view of the apparatus, taken along line 2—2 of Fig. 1.

Fig. 3 is a detail view showing an adjusting mechanism.

Fig. 4 is a detail sectional view taken along line 4—4 of Fig. 1.

Fig. 5 is a detail view, partly in section, of a pressure roller taken along the line 5—5 of Fig. 2.

Fig. 6 is an enlarged detail view of an edge of the slab and a puddler tool acting thereagainst.

In accordance with the invention adjoining bodies or portions of rubber-like plastic material in superimposed relation are advanced to present the margins of their joint progressively to means for effecting a rubbing or puddling action, or both, across the same which causes the material along the seam to be worked into a thoroughly commingled and strongly united condition.

Referring to the drawing, the numeral 10 designates a conveyor belt supported by rotatable idler rolls 11, journaled in supporting frame members 12, 13. The conveyor belt is also supported by driving pulleys (not shown). A slab or layer 15 of tire tread and sidewall stock is delivered progressively to the belt 10 from a suitable supply. A second slab or layer 16 of tread stock is fed onto the slab 15, as by means of a guide 17. A pressure roller 18, preferably comprising conical end portions 18a, 18b, is mounted above the belt 10, for rotation, in anti-friction bearings 19, 20 fitted in arms 21, 22 fixed to a shaft 23. Shaft 23 is journaled in side brackets, of which one is shown at 24 in Fig. 2, supported by frame-members 12, 13. A lever 26 is fixed to shaft 23 and is pivoted to a piston-rod 27 attached to a piston 28 of a double-acting fluid-pressure cylinder 29, pivotally mounted, at 30 to one of the frame members. The arrangement is such that roller 18 is forced toward the belt 10 and acts to press the slabs together but may be raised by reversal of the fluid pressure supply to cylinder 29.

There is provided, for working the marginal zone of the joint between the slab portions 15 and 16, so as to intermingle and interlock the materials thereof and seal the joint, a pair of puddling tools 31, 32 having blunt and preferably rounded ends 31a. These tools are rotatably supported in the path of seams between the materials and are adapted to rub or knead the material at the seam and across the same by frictional engagement therewith. Each puddling tool is provided with a driving motor 33, 34. To support the puddling tool resiliently, a socket 35 is fixed to each motor shaft 36 and a chuck 37 for holding the tool is slidably mounted in the socket 35 for limited axial movement permitted by a cross-pin 38 of the chuck 37 extending through a slot 39 of the socket. A compression coil spring 40 encircles the shank of the chuck between the socket 35 and the chuck 37 to cushion end-movement of the puddler.

Each puddler motor is fixed to a slide 41 fitted in a bracket 42 along which it may be adjusted by a screw 43 operable by a crank-handle 44 to move it toward or from the slab. Each bracket 42 is rotatably adjustable on an axis perpendicular to its slideway to change its angular relation to the work, and for this purpose has a shank 45 rotatably journaled in a bracket, the two brackets being shown at 46, 46' in Fig. 1. A cramp screw 47 serves to lock the brackets 42 and 46 in any desired adjustment.

Each bracket 46, 46' is adjustable in a direction across the belt 10 to adjust the apparatus to slabs of different widths, and for this purpose a shaft 50 is rotatably mounted in bearings 51, 52 fixed to the frame of the machine. Arms 53, 54, 55 are fixed to shaft 50 at intervals and a shaft 56 extends through aligned bearings in these arms so as to parallel shaft 50. Shaft 56 has right and left-handed threaded portions 57, 58. The left bracket 46, as seen in Fig. 1, is clamped to a threaded bushing 59 which engages a threaded portion of shaft 56. The other bracket 46' directly engages the threads of shaft 56. By turning the shaft 56, the tools may be moved simultaneously toward and from each other. By turning the bushing 59 one tool may be adjusted independently. A lock screw 60 locks the left bracket 46 to its threaded bushing 59. A knurled knob 61 fixed to shaft 56 facilitates turning of the shaft. The arrangement is such that the tools may be adjusted to align them with the work and for different widths of work.

To raise and lower the tools with respect to the conveyor belt, as when starting a new slab therethrough, a bell-crank lever 64 is fixed to shaft 56 and has a handle 65 on its longer leg. Its shorter leg has a stop pin 66 slidable in an aperture therethrough and engageable with sockets 67 formed in a flange 68 of bracket 51. The arrangement is such that by lifting the pin 66 the lever handle 65 may be moved to rotate shaft 56 and raise or lower the tools with relation to the work.

The tools 31 and 32 are each mounted so as to rotate about an axis that preferably extends obliquely away from the longitudinal vertical center plane of the work and obliquely in the direction of feed. As the tool is rotated about its axis in the direction of the arrow in Figs. 1, 2 and 6 the portion of the rounded end face of the tool in contact with the work is caused to be wiped and pressed across the seam away from the center of the tread, which action, together with the movement of the work past the tool, causes the kneading or puddling of the material of the slab portions to unite the same intimately and progressively along the seam. While smooth rounded ends of the tools, as shown for example at 31a in Fig. 6, have given good results, the end faces of the tools may be knurled or otherwise roughened, if desired, for effecting a stronger grip on the material of the work.

Additional pressure rollers 70, 71 are provided for rolling the seam in a direction of its length after it has passed the puddler tools. Each of these rollers is mounted for rotation about a pivot 72 on a bracket 73 fixed to a piston-rod 74 of a fluid pressure cylinder 75. The cylinder 75 is adjustable along a supporting bar 76 which extends across the conveyor, and is secured thereto by a screw 77. The wheel 70 is mounted at an angle to the vertical so that its face is parallel to the seamed margin of the slab. When air under pressure is released, the roller 70 is raised by a coil spring 81 on piston rod 74. An air pipe 80 connects the cylinder to any suitable source of supply (not shown).

In the operation of the apparatus of the invention, slabs 15 and 16 of plastic material such as unvulcanized rubber composition are assembled in superimposed relation on the conveyor belt 10. As they are conveyed along the belt, the roller 18 bears on the top slab and presses the slabs together. Thereafter, the puddler tools 31, 32 engage the margins of the slabs at the seams, the rotation of the tools causing them to engage the slab material frictionally at one side of the seam and to drag, knit, or puddle it across the seam, interlocking the two materials intimately and completely closing the seam against entrance of dirt or moisture.

As the slab leaves the puddler tools it travels below the roller 70 which rolls the puddled seam in a direction longitudinal of the slab, which further compacts the material and makes for greater smoothness of the surface.

The invention has been found useful especially in the forming of tread slabs for tires where the kneading or puddling action is effective to manipulate the material deeply below the exposed surface to effect a good union of the zones below. The invention, however, may be used advantageously to seam plastic material for purposes other than tire tread slabs, where a closed, intimately united seam is desired.

Variations may be made without departing from the scope of the invention as it is defined by the following claims.

We claim:

1. The method of uniting a body of plastic material to an adjoining body of yieldable material, which method comprises working the material of the bodies together at the edge of the first said body by wiping the surfaces of the bodies in a direction crosswise of said edge and along the same.

2. The method of uniting a body of plastic material to an adjoining body of yieldable material which method comprises working the material of the bodies together in the zone of the edge of the first said body by rotating the surface of a tool against the material in a direction across said edge and advancing the material to present its edge progressively to the tool along said edge.

3. The method of uniting a body of plastic material to an adjoining body of yieldable material which method comprises working the material of the bodies together in the zone of the edge of the first said body by rotating a rounded-end elongated tool about its longitudinal axis while the tool is held with its axis obliquely disposed with relation to the surface of the material with its rounded-end surface contacting the material in a manner to wipe the rounded end surface of the tool across said edge and along said edge.

4. The method of uniting strips of plastic rubber-like material in superimposed relation, the overlying strip having a beveled margin the edge of which is set back from the edge of the underlying strip, which method comprises advancing the strips in superimposed relation, and working the material of said strips in the zone of said edge of the first said strip by rotating a rounded-end elongated tool about its longitudinal axis while the tool is held with its axis disposed obliquely away from the central zone of the strips and obliquely in the direction of advance of the strips, and with its rounded-end surface contacting the material in a manner to wipe the rounded end surface of the tool across said edge in the direction away from the central zone of said strips as the strips are advanced.

5. The method of uniting strips of plastic rubber-like material in superimposed relation, the overlying strip having beveled margins, the edges of which are set back from the edges of the underlying strip, which method comprises advancing the strips in superimposed relation, and working the material of said strips in zones of the edges of the first said strip by rotating rounded-end elongated tools about their longitudinal axes while the tools are held with their axes disposed obliquely away from the zones of the strips and obliquely in the direction of the advance of the strips and with their rounded-end surfaces contacting the material in a manner to wipe the rounded-end surfaces of the tools across said edges in the directions away from the central zone of said strips as the strips are advanced.

6. The method of seaming a joint in an article of unvulcanized rubber-like material which comprises rubbing the rubber-like material adjacent the joint in a direction cross-wise of the joint, and then rolling said material in a direction lengthwise of the joint.

7. The method of seaming adjoining bodies of unvulcanized rubber-like material of the bodies which comprises puddling the material at their abutting surfaces.

8. The method of uniting adjoining bodies of unvulcanized rubber-like material which comprises assembling the bodies in overlapping relation, applying a blunt tool to the exposed surface of one of said bodies at a position overlying the overlap, and moving the tool in a direction to wipe a surface thereof crosswise of the overlap and to depress and knead the material so as to manipulate the same throughout a depth including the zone of the overlapping faces thereof.

9. Apparatus for uniting a body of plastic material to an adjoining body of yieldable material which apparatus comprises a rounded-end tool, means for moving the tool in a wiping movement of its rounded-end against the material across the edge of the first said body, and means for effecting relative movement of the material and said tool along said edge.

10. Apparatus or uniting a body of plastic material to an adjoining body of yieldable material which apparatus comprises a rounded-end elongated tool, means for supporting said tool with its axis disposed obliquely with relation to the surface of the material and for rotating the tool about its longitudinal axis to wipe the rounded-end thereof across the edge of the first said body, and means for effecting relative movement of the material and said tool along said edge.

11. Apparatus for uniting strips of plastic rubber-like material in superimposed relation with a beveled margin of the overlying strip set back from the edge of the underlying strip, said apparatus comprising means for advancing the strips, a rounded-end elongated tool, and means for supporting said tool with its axis disposed obliquely away from the central zone of the strips and obliquely in the direction of advance of the strips and for rotating the tool about its axis to wipe its rounded end across said beveled margin.

12. Apparatus for uniting strips of plastic rubber-like material in superimposed relation with beveled margins of the overlying strip set back from the edge of the underlying strip, said apparatus comprising means for advancing the strips, a pair of rounded-end elongated tools, and means for supporting said tools with their axes disposed obliquely away from the central zone of the strips and obliquely in the direction of advances of the strips and for rotating the tools about their axes to wipe their rounded-ends across said beveled margins in the directions away from the central zone of the strips.

CHARLES W. LEGUILLON.
HARVEY L. YOUNG.